United States Patent
Baer et al.

(10) Patent No.: US 6,563,239 B1
(45) Date of Patent: May 13, 2003

(54) FITTING ARRANGEMENT FOR AN ANTIVIBRATION MOUNTING FOR AN ELECTROMOTOR

(75) Inventors: Martin Baer, Mulfingen (DE); Dieter Best, Ingelfingen (DE)

(73) Assignee: ebm Werke GmbH & Co., Mulfingen (DE)

( * ) Notice: Subject to any disclaimer, the term of this patent is extended or adjusted under 35 U.S.C. 154(b) by 0 days.

(21) Appl. No.: 09/605,218

(22) Filed: Jun. 28, 2000

(51) Int. Cl.$^7$ ................................................ H02K 5/24
(52) U.S. Cl. ........................... 310/51; 310/91; 248/603; 248/638
(58) Field of Search ................... 310/51, 91; 248/603, 248/609, 613, 637, 638

(56) References Cited

U.S. PATENT DOCUMENTS

| | | | | |
|---|---|---|---|---|
| 4,587,863 A | * | 5/1986 | Wadensten | 248/638 |
| 4,648,579 A | * | 3/1987 | Wilson | 248/566 |
| 4,805,868 A | * | 2/1989 | Claude | 165/122 |
| 5,761,850 A | | 6/1998 | Lhotak et al. | 49/360 |
| 6,029,942 A | * | 2/2000 | Daddis et al. | 248/635 |

FOREIGN PATENT DOCUMENTS

| | | |
|---|---|---|
| DE | 7304418 | 5/1973 |
| FR | 2740625 | 4/1997 |

* cited by examiner

Primary Examiner—B Mullins
(74) Attorney, Agent, or Firm—Harness, Dickey & Pierce, P.L.C.

(57) ABSTRACT

The invention relates to a fitting arrangement for an antivibration mounting of an electromotor (1) on a load-bearing component by means of several interelements (6) arranged distributed around the perimeter and consisting of an elastic material. To always achieve an optimum vibration isolation independently of the motor's fitting position, it is provided that the interelements (6) are designed as oblong, radially aligned web elements (8) and are arranged axially, clamped under elastic prestress, between a mounting surface (12) on the motor side.

15 Claims, 5 Drawing Sheets

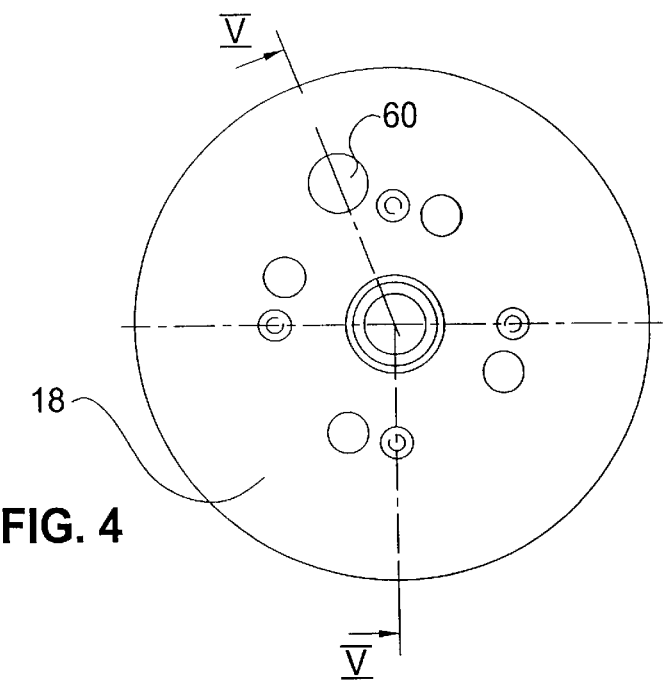
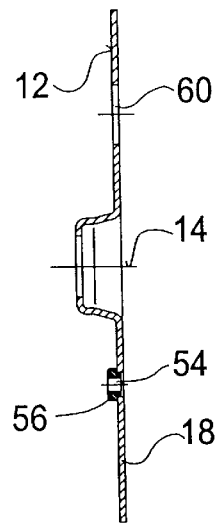
FIG. 4
FIG. 5
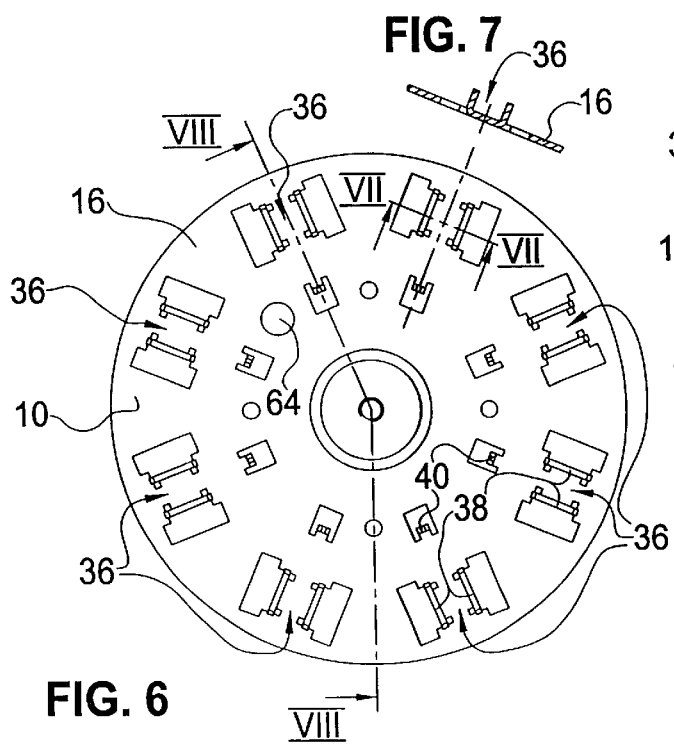
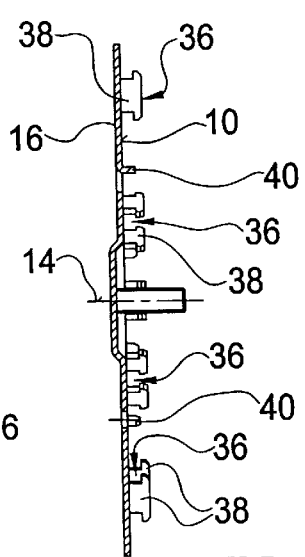
FIG. 7
FIG. 6
FIG. 8

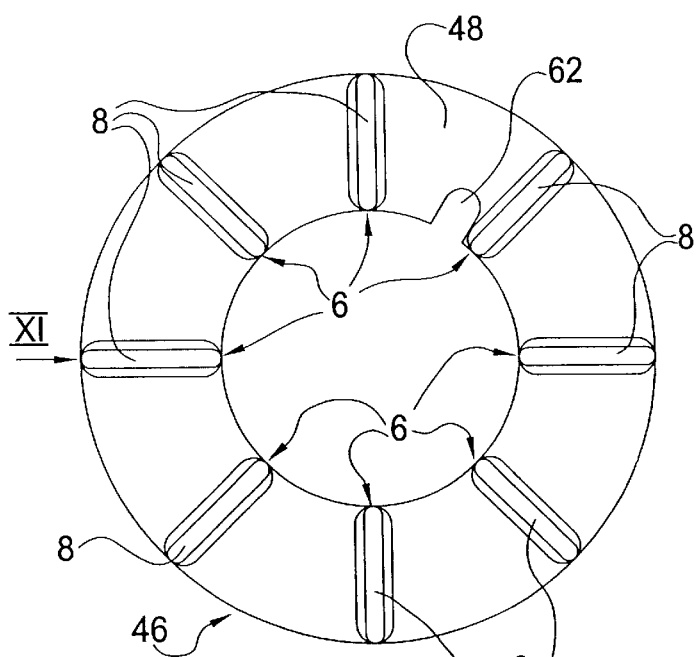
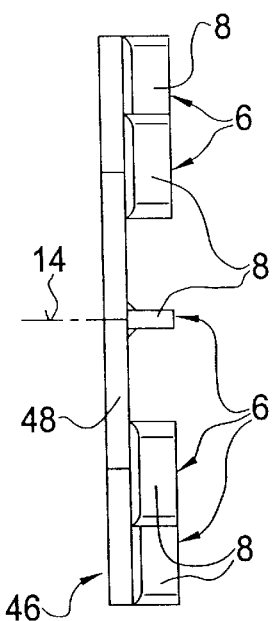
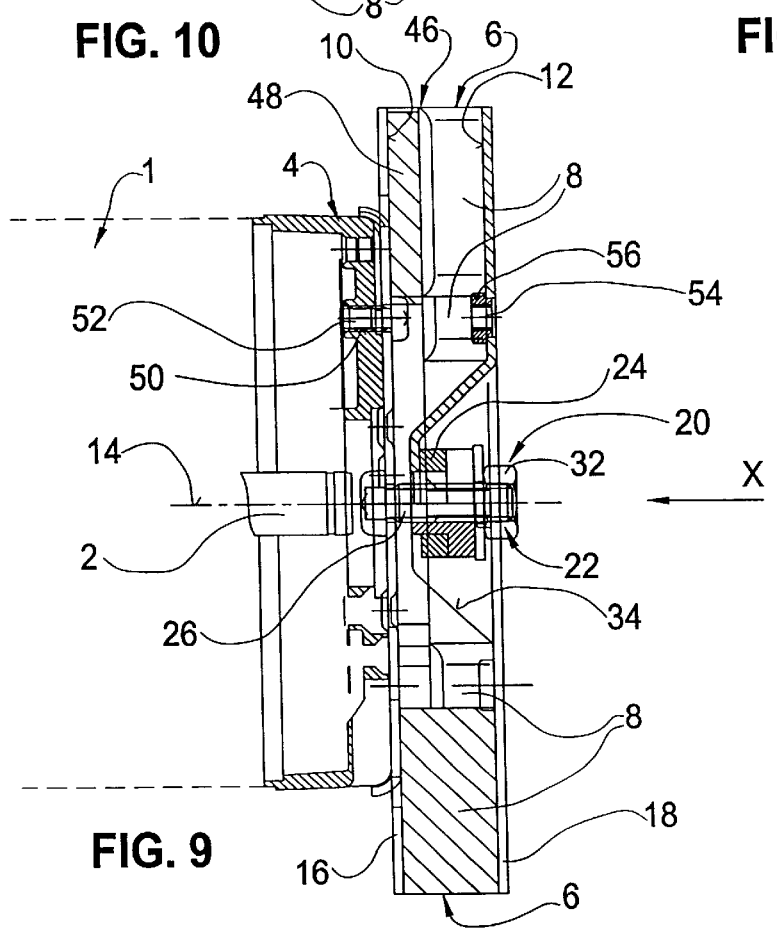
FIG. 10
FIG. 11
FIG. 9

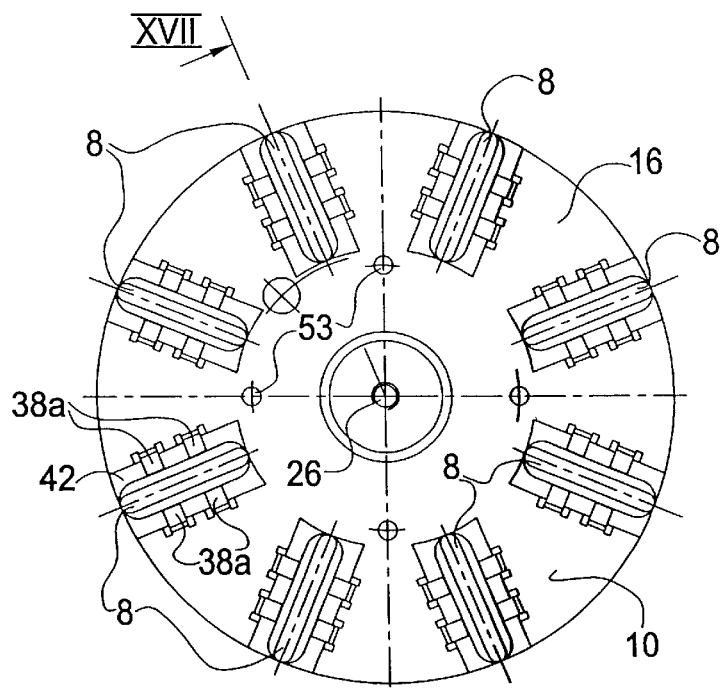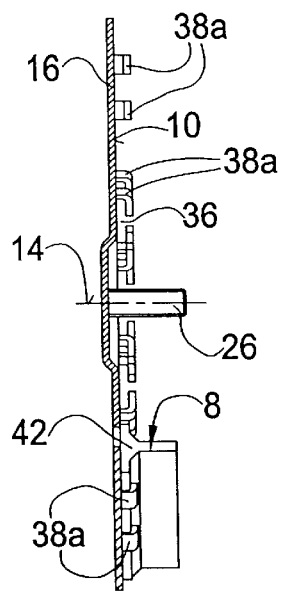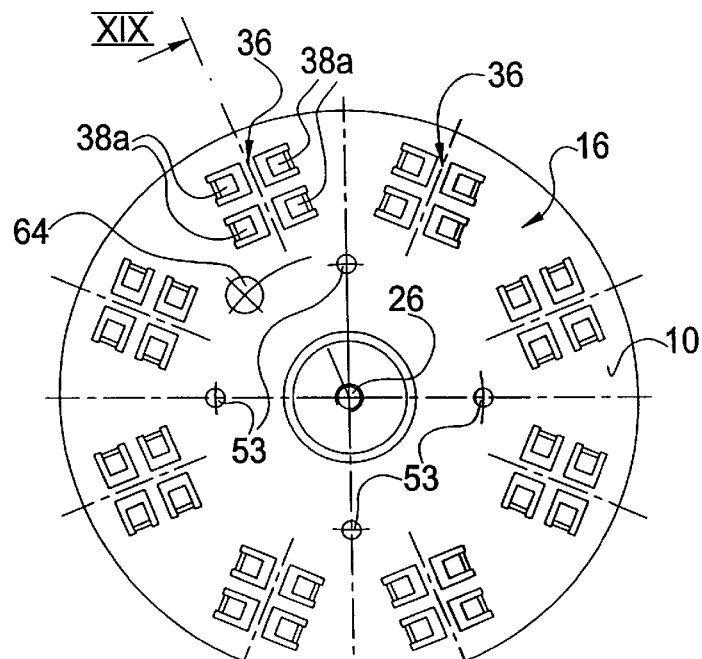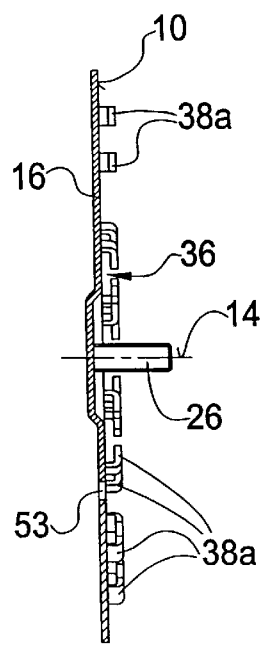
FIG. 16
FIG. 17
FIG. 18
FIG. 19

FITTING ARRANGEMENT FOR AN ANTIVIBRATION MOUNTING FOR AN ELECTROMOTOR

BACKGROUND OF THE INVENTION

The present invention relates to a fitting arrangement for an antivibration mounting of an electromotor on a load-bearing component by means of several interelements arranged distributed around the perimeter and consisting of an elastic material.

An example of such a motor mounting is described in the prior printed publication DE4306588A1. In this known motor mounting, elastic interelements (isolators) are radially situated with positive locking between the motor casing and an external motor bracket and within the space enclosing the motor casing. For this, the motor casing features radially protruding retaining segments on the one hand, and the isolators are placed upon them with corresponding slots. On the other hand, each isolator supports itself in the radial direction on two supporting surfaces on the motor bracket side, each surface running at an acute angle to the radial. Precisely adapted isolators are required because of the positively locking base. In addition, the remaining parts must also be specially adapted; i.e. retaining segments, isolators, and supporting surfaces must be synchronized to each other in order to achieve the desired vibration reducing support. The motor's special, radially protruding retaining segments can be troublesome in other applications, so that the motor can't be introduced for particular missions. There is only limited elasticity because of the special design and fitting arrangement of the isolators, wherein the motor contains them and the retaining segments engage the isolators. To this extent, the vibration isolation or damping achieved here is still worthy of improvement.

DE3500867C2 describes an electromotor, that is fastened by a holding strip that is connected to the motor with an angle support by two diametrically opposite, block-like elements of elastomeric material. The angle support is tightly attached to the motor's cover. The elastomeric elements are connected to both the holding strip and also the angle support by vulcanizing or gluing. Such a motor fastening may only be used for relatively small motors, because the load-carrying connection exclusively consists of material locking (vulcanization or adhesion). In addition, this also leads to fairly expensive production.

DE3638393C2 describes another fitting arrangement for vibration reducing mounting of an electromotor. A motor is fastened to a casing wall or mounting wall by elastomeric isolators in this case too. To do this, the vibrators are held in an opening of the mounting wall with positive locking. Moreover, the isolators are arranged pressed together defined between the motor and a fastening plate. Specifically, we are dealing with four separate circular isolators, which are situated in the corners of an imaginary square and form a punctiform layout to the respective motor and mounting plate. In principle, this known absorbing arrangement therefore has the same absorbing characteristics and the same stiffness axially and radially.

Finally, DE4405577A1 describes a vibration reducing fitting arrangement with a single-pieced elastic isolator, which is basically designed as disc-shaped. This isolator is attached to the motor by several screwed connections passing through the isolator on the one hand, and to the bearer by joining elements arranged displaced around the perimeter on the other hand.

SUMMARY OF THE INVENTION

Proceeding from the state of the art, it is the objective of the present invention to create a fitting arrangement of the generic type, which will always achieve optimum vibration isolation independently of the motor's fitting position.

This is achieved according to invention, in that the interelements are designed as oblong, radially aligned web elements and are arranged axially, clamped under elastic prestress, between a mounting surface on the motor side and a seating on the bearer side. At the same time, the web elements are arranged in such a way, and are designed in such a way regarding their shape and elastic characteristics, that the connection between the electromotor and the load-bearing component, viewed from the motor's perimeter or direction of rotation, is less rigid, i.e. lighter, deformable with less force, than in all other directions in space.

Through the development according to invention, it is achieved that the support in the axial direction features greater stiffness than in the motor's peripheral direction or direction of rotation. The attachment of the motor to the respective load-bearing component is relatively stiff for five of a total of six degrees of freedom in space (three translational and two rotational degrees of freedom). A distinctly less rigid support is achieved in regards to the last degree of freedom, i.e. the motor's sense of rotation, because in this direction the web elements according to invention are elastically deformed exclusively perpendicular to their longitudinal extension, because any imaginary circle around the axis of rotation always cuts the radially arranged web elements perpendicularly. According to invention, the motor's torque can indeed be adequately supported on the one hand, but the disturbing torque roughness (ripple torque, cogging torque, commutation activity) will effectively be isolated or dampened toward the load-bearing component to advantage.

The fitting arrangement according to invention is suitable above all for the one-sided "overhung" fastening of electromotors, such as external rotor motors for blower drives.

Frictional locking in the system will first of all provide an anti-rotation element of the electromotor against relative rotation vis-à-vis the load-bearing component. This indeed occurs primarily through static friction, whereby undesired damping effects (non-linear frictional losses, etc.) are avoided. In addition to this, however, extra anti-rotation elements and/or centering aids can also be present, especially through positive-locking elements.

Additional developmental features of the invention are contained in the dependent claims and in the following-description.

BRIEF DESCRIPTION OF THE DRAWINGS

The invention will now be explained in more detail based on preferred examples illustrated in the drawing. It shows:

FIG. 4 is another component part of the fitting arrangement in plan view (arrow X depicted in FIG. 1), FIG. 5 is a cross section along the line V—V in FIG. 4, FIG. 6 is a view analogous to FIG. 2, but without the web elements, FIG. 7 is a cross section in the plane VII—VII depicted in FIG. 6, FIG. 8 is a cross section along the line VIII—VIII depicted in FIG. 6, FIG. 9 is a second embodiment of the fitting arrangement according to invention in an illustration analogous to FIG. 1, FIG. 10 is a plan view of a web element similar to the illustration in FIG. 2 (direction of the arrow X depicted in FIG. 9), FIG. 11 is a side view in the direction of arrow XI depicted in FIG. 10, FIG. 16 is a view analogous to FIG. 2 in a variation of the embodiment, FIG. 17 is a cross section along the line XVII—XVII in FIG. 16, FIG. 18 is an illustration analogous to FIG. 6 (without web elements) in the variation of FIGS. 16 and 17, and FIG. 19 is a cross section XIX—XIX as depicted in FIG. 18.

In the different figures of the drawing, the same parts, or parts and components corresponding in function, are always provided with the same labels and will therefore each only be described once as a rule.

FIG. 1 and FIG. 9 each show an electromotor 1 merely schematically. Only one end of a motor shaft 2 and a basically disc-shaped motor flange 4 are concretely represented. The electromotor 1 is fastened on one side (overhanging) to an unillustrated load-bearing component by means of the motor flange 4. For the purpose of vibration isolation, this fastening is performed directly by means of several interelements 6, which are distributed across the perimeter of the electromotor 1 and which consist of an elastic material.

Figure 2:
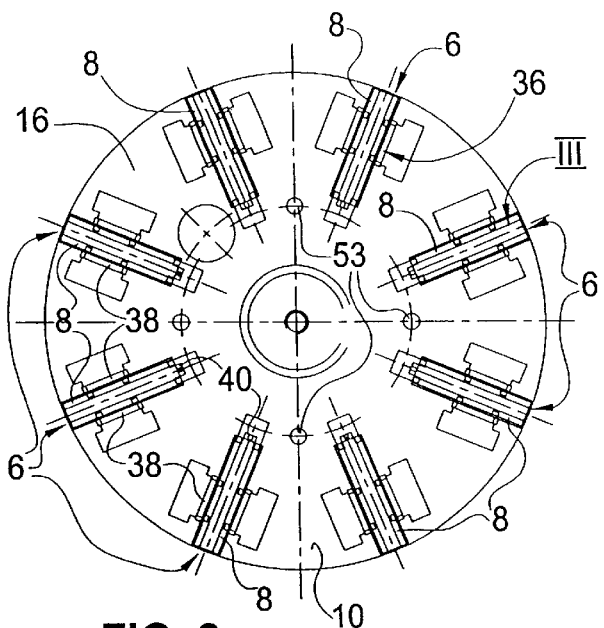
FIG. 2 is a plan view, in the direction of the arrow X depicted in FIG. 1, of a component part of the fitting arrangement according to invention with elastic web elements.
Figure 1:
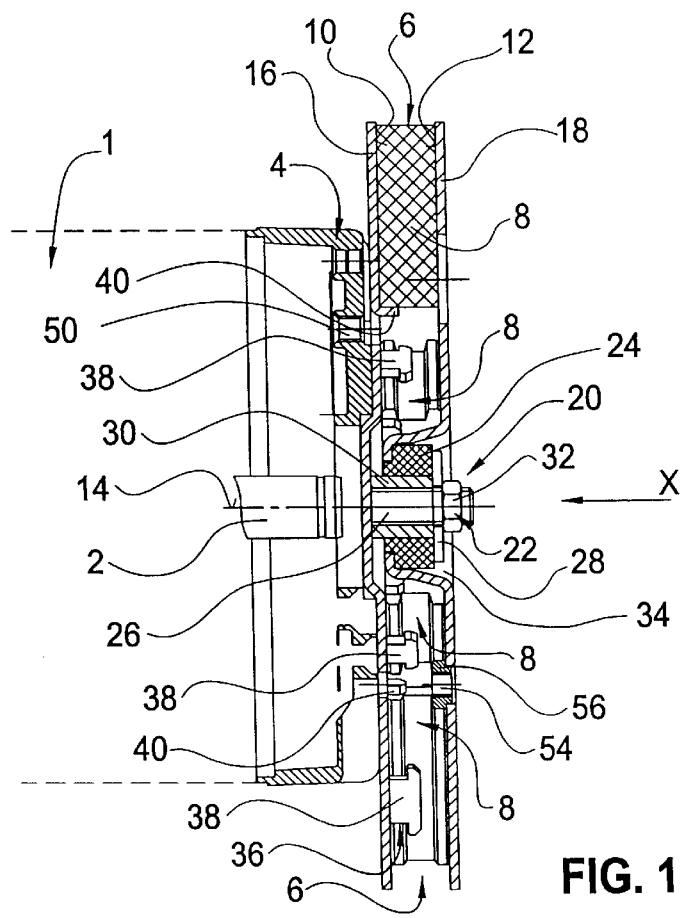
FIG. 1 is an axial cross section through a fitting arrangement according to invention in a first preferred embodiment.

As can best be seen in FIGS. 2, 10, and 16, it is provided according to invention, that the interelements 6 are designed as oblong, radially aligned web elements 8. As depicted in FIGS. 1 and 9, these web elements 8 are arranged axially, clamped between a mounting surface 10 on the motor side and a seating 12 on the bearer side by means of elastic prestress (non-positive gripping). At the same time, the web elements 8 are designed in such a manner regarding their shape and the elastic characteristics resulting therefrom, that the connection between electromotor 1 and the respective load-bearing component, viewed from the motor's perimeter or direction of rotation, is less rigid than in all other spatial directions or degrees of freedom, respectively. Above all, the radial star-like fitting arrangement of the web elements 8 achieves a high stiffness in the axial and radial direction of the web elements 8 as well as in the tipping direction of the rotational axis (tipping around a quadrature axis perpendicular to the rotational axis). In contrast to this, the web elements 8, viewed in the motor's direction of rotation, only contribute to a very minor portion of the stiffness; there is a relatively less rigid support that permits a tiny movement of the motor in the direction of rotation. We are thus dealing with a "rotationally nonrigid" fastening that is relatively fast in the axial and radial direction, however. The axial clamping of the web elements 8 according to invention leads to the result, that it is primarily shear stress and compressive stress that appear as the stress in arbitrary directions. When the electromotor 1 is tipped, because of the weight from the horizontal position of the shaft for example, higher compressive stresses will appear in the web elements 8 that are lower at the time, and the compressive stress produced by the prestress will reduce itself in the web elements 8 pointing upwards. In the limiting case, the equivalent stiffness of the entire fitting arrangement in the direction of rotation will tend toward digression, a fact which is also advantageous for the vibration isolation effect. The compressive prestress of the elastic web elements 8 produces a relatively high position insensitivity. Additional deformations, such as in the tipping direction around the quadrature axis that runs perpendicular to the motor axis, are held to a minimum by a progressivity that appears in the pressure loading of elastomeric materials.

In the illustrated examples, the mounting surface 10 and the seating 12 are each arranged basically parallel to each other and perpendicular to the motor axis 14. The web elements 8 are arranged in a radially symmetric distribution (star-like). Depending on the size and weight of the electromotor 1 to be mounted, three through twelve, especially six through ten, web elements 8 can be present. The illustrated examples each deal with eight web elements 8. Moreover the mounting surface 10 on the motor side is preferably formed by a disc element 16 fastened to the electromotor 1 and consisting of sheet metal in particular. Alternatively however, the motor flange 4 can also form the mounting surface 10 directly, so that an extra disc element would be superfluous. The seating 12 on the bearer side is preferably also formed by a separate second disc element 18. Here too, the utilization of the respective load-bearing component itself as the seating 12 can be provided as an alternative; In this case, the respective load-bearing component would consequently be a component of the fitting arrangement according to invention. In the preferred example, the second disc element 18 will also preferably consist of sheet metal.

The two disc elements 16 and 18 can be braced against each other axially by clamping tools 20 to produce vibration isolation. A centric screwed connection 22 is preferably provided as clamping tool 20 (see FIGS. 1 and 9 in particular), wherein the disc elements 16 and 18 are definably braceable by means of this screwed connection 22 and by an elastic ring element 24, i.e. with a defined axial tension force. As depicted in FIG. 1, a threaded bolt 26, which extends axially, openly, and contactless through a centric opening of the second disc element 18, is connected with the first disc element 16 for this purpose. The threaded bolt 26 bears a thrust washer 28 at its end. The elastic ring element 24 is installed between this thrust washer 28 and the second disc element 18. Moreover, a dimensionally stable spacer sleeve 30, which likewise passes through the centric opening of the second disc element 18, is located between the thrust washer 28 and the first disc element 16. A nut 32, which can clamp the thrust washer 28 against the elastic ring element 24, is screwed onto the open end of the threaded bolt 26 until a defined tension is achieved from abutting the spacer sleeve 30. In respect to its axial length, the spacer sleeve 30 is designed to adapt to the elastic characteristics of the elastic ring element 24 in such a manner, that the web elements 8 according to invention are each acted upon with the desired prestress. Because of the described development of the clamping tools 20 and the centric screwed connection 22, the two disc elements 16, 18 are not connected directly in this region, but connected vibration isolated by means of the elastic ring element 24. At the same time, the second disc element 18 preferably features, within its centric region, a region bent at right angles to form a centric cavity 34 in such a manner, that the elastic ring element 24 is arranged countersunk in this cavity 34.

The present description also applies analogously or similarly to the embodiment of FIG. 9.

What relates specially to the embodiment depicted in FIGS. 1 through 8, is that the individual web elements 8 are here mounted pre-attached to the mounting surface 10 on the motor side. Alternatively, an appropriate mounting could certainly also be provided on the opposite side of the seating 12 on the bearer side. In a preferred example, each web element 8 is located within a retaining recess 36 of the first disc element 16 on the motor side (also see FIGS. 6, 7, and 8). It is expedient for each of the retaining recesses 36 to be made from two web-like sheet metal shackles 38, which are cleanly cut out of the sheeting material of the disc element 16, and bent vertically upwards and parallel to each other. Each elastic web element 8 is wedged at least non-positively, located between the shackles 38 and the respective retaining recess 36. A positive-locking or at least non-positive fastening can also be provided by bending the shackles 38 even further inwards after the respective web element 8 has been inserted. Limit stops 40, which are likewise expediently formed from sheet metal shackles that have been cleanly cut and bent upwards, are preferably provided to support the web elements 8 in a radial direction inwards. Appropriate limit stops could also be provided in a radial direction outwards, in deviation from the illustrated example.

Figure 3:
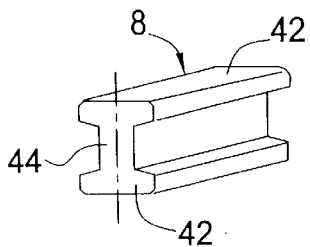
FIG. 3 is an enlarged perspective view of one of the web elements according to invention (region III in FIG. 2)

The web elements 8 used in the embodiment of FIGS. 1 through 8 each feature a cross section in the shape of a standard H-beam as depicted in FIG. 3, with two wider limit stop sections 42, formed by T cross ribs and located opposite the motor axis 14, as well as with a narrower connecting section 44 formed by a T longitudinal rib. With the two limit stop sections 42, the web segments 8 abut the mounting surface 10 and seating 12 located opposite.

The main difference of the embodiment depicted in FIGS. 9 through 15 is that the web elements 8 are components of a one-pieced elastic vibration isolation element 46, wherein the web elements 8 are integrally molded, especially on one side of a base plate 48 shaped like a disk plate (see FIGS. 10 and 11 in particular). The base plate 48 preferably abuts the mounting surface 10 on the motor side, whilst the web elements 8 with their open radial bearing surfaces abut the seating 12 on the bearer side. But a reverse fitting arrangement could also be provided in principle. In this embodiment, the web elements 8 each preferably feature a basically square web cross section.

Let it generally be noted, that the cross sectional geometry of the web elements 8 can influence the elastic characteristics of the motor suspension, especially in the direction of rotation in spacious areas. Nearly arbitrary web cross sections are therefore possible for both embodiments, even including the frustum of a pyramid for example. In addition, combinations of differently shaped web elements 8 are also possible in one embodiment of the fitting arrangement according to invention. Instead of the cross section illustrated in FIG. 3, the embodiment of FIGS. 1 through 8, for example, could also feature a cross sectional shape in which the limit stop section 42 is missing on the bearer side.

The variation depicted in FIGS. 16 through 19 is an example of such a shape. It is additionally provided at the same time, that each web element 8 is also held in its retaining recess 36 with positive locking. For this, each retaining recess 36 is bounded by retaining segments 38a that each engage the limit stop segment 42 of the web element 8 like a hook with ends folded down inwards toward each other. Each retaining recess 36 is preferably formed by two times two retaining segments 38a opposite each other in pairs. Each web element 8 is pushed into the corresponding retaining recess 36 in the radial direction from outside to inside, i.e. with the section 42 between the retaining segments 38a.

As can be deduced from FIGS. 1 and 9, the first disc element 16 on the motor side is expediently screwed into position with the motor flange 4. The motor flange 4 conventionally has mounting bolt holes 50, especially in the form of tapped holes, each of which is engaged by one screw 52, wherein the screw 52 passes through a through-hole 53 of the disc element 16. For connecting to the load-bearing component, which isn't illustrated, the second disc element 18 on the bearer side features appropriate assembly holes 54, whose fitting arrangement preferably corresponds to the hole arrangement of the motor flange 4. Through these measures, the electromotor 1 can alternatively be fasted to the load-bearing component with or without the vibration isolation arrangement according to invention. The assembly holes 54 can be formed by insert nuts 56 fastened in the sheet metal part.

It should be noted again, that integration with the respective load-bearing component can also be provided in place of a separate disc element on the bearer side, i.e. the seating 12 can already be a component of the load-bearing component before the motor is assembled.

Anti-rotational locking of the electromotor 1 relative to the load-bearing component is ensured according to invention primarily by static friction in the region of the axially clamped web elements 8. However, additional positive-locking elements can also be advantageously provided for intermeshing as a safety device against rotation and/or centering between the electromotor 1 and the load-bearing component. Such elements are not illustrated in the figures.

Figure 12:
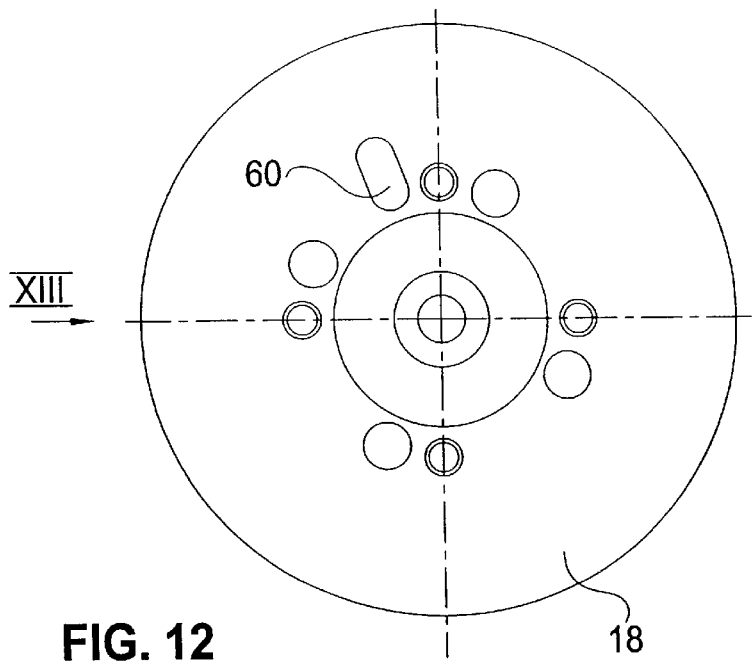
FIG. 12 is a plan view of a component part corresponding to FIG. 4.
Figure 13:
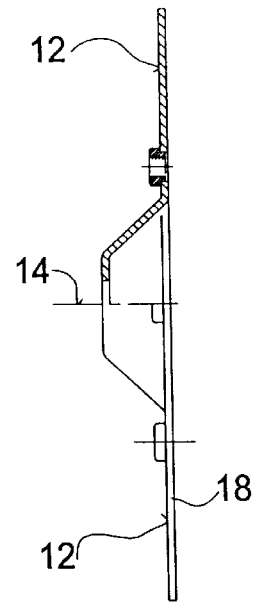
FIG. 13 is a side view of the component part cut in half in the direction of the arrow XIII depicted in FIG. 12.
Figure 14:
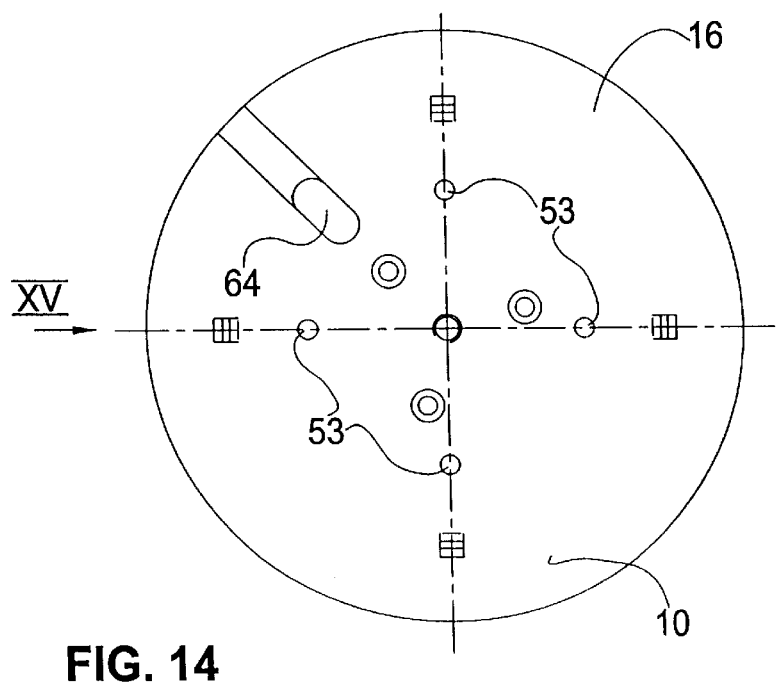
FIG. 14 is a plan view of a component part analogous to the embodiment depicted in FIG. 6.
Figure 15:
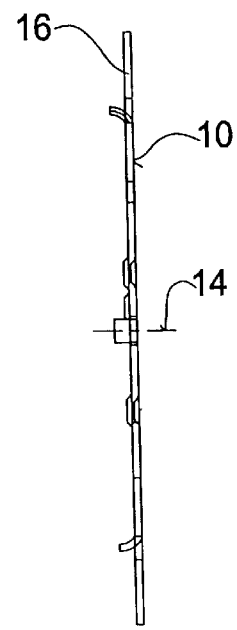
FIG. 15 is a side view in the direction of the arrow XV depicted in FIG. 14.

As can still be deduced from FIGS. 4 and 5, the second disc element 18 can feature a hole 60 for an unillustrated motor cable to pass through (also see FIG. 12). Even the one-pieced isolation element 46 depicted in FIG. 10 can feature a recess 62 in its base plate 48 for a cable to feed through. Finally, an appropriate cable opening 64 can also be formed in the first disc element 16 (see FIGS. 6, 14, and 18 for example).

The invention is not limited to the examples specifically illustrated and described, but also includes all embodiments that operate in the same manner as the spirit of the invention. For example, a spring element composed of a different material could be utilized instead of the centric ring element 24 composed of elastomeric material. The only basic thing here is that vibration isolation and tension are ensured at the same time.

For the present moreover, the invention is not yet limited to the combination of characteristics defined in claim 1 but can be defined by any other arbitrary combination of particular characteristics of all individual characteristics disclosed as a whole. This means, that practically every individual characteristic of claim 1 can be omitted in principle and be replaced by at least one individual characteristic disclosed at another place in the application. To this extent, claim 1 is to be understood only as a first attempt at formulating an invention.

We claim:

1. A fitting arrangement for an antivibration mounting of an electromotor on a load-bearing component by means of several interelements distributed about the perimeter of said electromotor and comprising an elastic material, said interelements being oblong, radially-aligned web elements and arranged axially, and being clamped under elastic prestress, between a mounting surface on the motor side and a seating on the bearer side, said mounting surface being formed by a disc element, preferably consisting of metal, and being fastened to said electromotor, and said seating being formed by a disc element, preferably consisting of metal, and wherein said disc elements can be braced against the other axially by a centric clamping tool vibrationally isolated from said disc elements.

2. Fitting arrangement as recited in claim 1, wherein said web elements are arranged and designed in such a way that the connection between said electromotor and the load-bearing component is less rigid in the electromotor rotational direction than in all other spatial directions.

3. Fitting arrangement as recited in claim 1, wherein said mounting surface and said seating are each arranged basically parallel to each other and perpendicular to the motor axis.

4. Fitting arrangement as recited in claim 1, wherein said web elements are arranged in a radially symmetric distribution.

5. Fitting arrangement as recited in claim 1, wherein three through twelve, and preferably six through ten, web elements are present.

6. Fitting arrangement as recited in claim 1, wherein said disc elements are definably braceable by means of a centric screwed connection and by an elastic ring element.

7. Fitting arrangement as recited in claim 1, wherein said individual web elements are pre-attached on the motor side or on the bearer side, and within retaining recesses of said disc element on the motor side.

8. Fitting arrangement as recited in claim 1, wherein said web elements are components of a one-pieced elastic vibration isolation element, wherein said web elements are integrally molded, preferably on one side of a base plate.

9. Fitting arrangement as recited in claim 1, wherein said web elements each preferably feature basically square web cross section.

10. Fitting arrangement as recited in claim 1, wherein said disc element on the motor side is connected with a motor flange of said electromotor, preferably by means of screws.

11. Fitting arrangement as recited in claim 1, for connection with the load-bearing component, said disc element features assembly holes, whose fitting arrangement preferably corresponds to a hole arrangement of said motor flange of said electromotor.

12. A fitting arrangement for an antivibration mounting of an electromotor on a load-bearing component by means of several interelements distributed about the perimeter of said electromotor and comprising an elastic material, said interelements being oblong, radially-aligned web elements and arranged axially, clamped under elastic prestress, between a mounting surface on the motor side and a seating on the bearer side, said web elements each having a cross-section in the shape of a standard H-beam, with two wider limit stop sections formed by two axially opposing T cross ribs and by a narrower connecting section formed by a T longitudinal rib.

13. A fitting arrangement for an antivibration mounting of an electromotor on a load-bearing component by means of several interelements distributed about the perimeter of said electromotor and comprising an elastic material, said interelements being oblong, radially-aligned web elements and arranged axially, clamped under elastic prestress, between a mounting surface on the motor side and a seating on the bearer side, said web elements each having an approximately T-shaped cross section with a widened limit stop section.

14. A fitting arrangement for an antivibration mounting of an electromotor on a load-bearing component by means of several interelements distributed about the perimeter of said electromotor and comprising an elastic material, said interelements being oblong, radially-aligned web elements and arranged axially, clamped under elastic prestress, between a mounting surface on the motor side and a seating on the bearer side, and a positive-locking element for acting against rotation between said electromotor and said load-bearing component.

15. Fitting arrangement as recited in claim 14, wherein said positive-locking element acts against shifting on a lateral plane of said electromotor relative to said load-bearing component.

* * * * *